United States Patent [19]

Cooper

[11] Patent Number: 4,916,801
[45] Date of Patent: Apr. 17, 1990

[54] METHOD OF FORMING A STEM WITH A GROOVE AND A SNAP RING

[75] Inventor: Kenneth E. Cooper, South Bend, Ind.

[73] Assignee: Shepherd Products, U.S., Inc., St. Joseph, Mich.

[21] Appl. No.: 374,630

[22] Filed: Jun. 30, 1989

Related U.S. Application Data

[60] Continuation of Ser. No. 257,058, Oct. 13, 1988, abandoned, which is a division of Ser. No. 158,786, Feb. 22, 1988, abandoned.

[51] Int. Cl.⁴ .............................................. B23P 11/00
[52] U.S. Cl. ........................................ 29/512; 29/509; 72/356
[58] Field of Search ........................................... 29/509

[56] References Cited

U.S. PATENT DOCUMENTS

| | | | |
|---|---|---|---|
| 2,577,654 | 12/1951 | Gates | 29/512 |
| 3,497,946 | 3/1970 | Tingley, Jr. | 29/512 |
| 4,120,071 | 10/1978 | Crescenzi | 16/38 X |
| 4,214,781 | 7/1980 | Joseph | 29/512 X |
| 4,364,159 | 12/1982 | Holcombe | 29/509 X |
| 4,615,098 | 10/1986 | Côme et al. | 29/512 |

FOREIGN PATENT DOCUMENTS

| | | | |
|---|---|---|---|
| 217033 | 6/1924 | United Kingdom | 16/38 |
| 1485591 | 9/1977 | United Kingdom | 16/37 |

*Primary Examiner*—Joseph M. Gorski
*Attorney, Agent, or Firm*—Lee, Mann, Smith McWilliams & Sweeney

[57] ABSTRACT

A stem with a specially constructed groove and a snap ring is disclosed along with a method of forming the groove and assembling the snap ring whereby a snap ring is first assembled about a reduced diameter portion of a stem on which a support surface of larger diameter has been formed and a retention groove is then formed by peening over the top end of the stem to form a collar which becomes the upper wall of the groove and retains the snap ring about the stem.

4 Claims, 1 Drawing Sheet

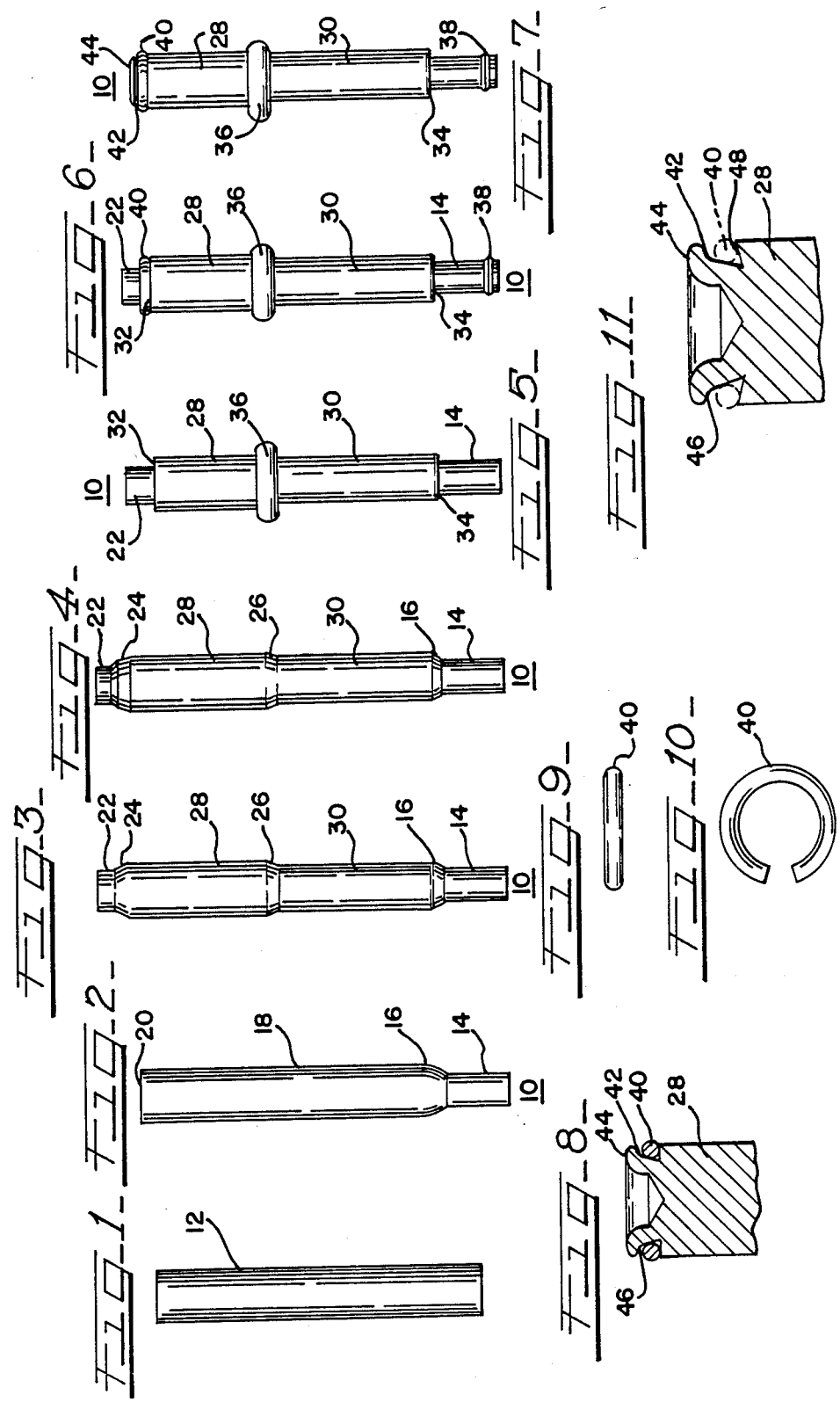

4,916,801

METHOD OF FORMING A STEM WITH A GROOVE AND A SNAP RING

This is a continuation of my application Ser. No. 257,058, filed Oct. 13, 1988, which was a division of my application Ser. No. 158,786, filed Feb. 22, 1988, both now abandoned.

BACKGROUND OF THE INVENTION

The present invention related to a stem, groove and snap ring assembly and a method of forming a groove on a stem and assembling a snap ring. Methods of this general type are shown in the prior art patents 1,896,028, 2,464,622, 2,957,237, 3,686,743, 3,702,085 and 4,189,978. Prior methods of forming a groove about which a snap ring is inserted comprised milling the groove in the stem and then deforming the ends of the snap ring to force the snap ring to fit about the diameter of the stem and then closing the snap ring ends. Stem and snap ring assemblies and other caster retention mechanisms are shown in U.S. Pat. Nos. 3,755,852, 3,834,006 and 4,129,921.

SUMMARY OF THE INVENTION

The apparatus of the present invention is a stem having a groove of special construction with an outwardly and upwardly inclined upper wall and a downwardly and inwardly inclined lower wall, the groove adapted to receive and confine an expansible and contractible snap ring.

The method of the present invention consists of forming a stem with a groove and assembling a snap ring whereby the groove is formed by reducing the diameter of a section of the top end of the stem, defining a support surface at the lower end of the reduced diameter section, assembling the snap ring over the reduced diameter section, inserting a punch into the top end of the stem and exerting downward force so that the stem upper end is deformed into a collar which forms the upper wall of the groove and retains the snap ring about the stem.

BRIEF DESCRIPTION OF THE DRAWINGS

FIG. 1 shows a length of wire from which the stem is formed.

FIG. 2 shows the stem at the first stage of the formation process.

FIG. 3 shows the stem at the second stage of the formation process.

FIG. 4 shows the stem at the third stage of the formation process.

FIG. 5 shows the stem at the fourth stage of the formation process.

FIG. 6 shows the stem at the fifth stage of the formation process.

FIG. 7 shows the assembled stem and snap ring.

FIG. 8 shows an enlarged cross-sectional view of the assembled stem and snap ring shown in FIG. 7.

FIG. 9 is a side view of the snap ring.

FIG. 10 is a top view of the snap ring of FIG. 9.

FIG. 11 shows an enlarged cross-sectional view of a modified embodiment of the assembled stem and snap ring shown in FIG. 7.

DETAILED DESCRIPTION OF THE INVENTION

FIGS. 1–6 in the drawings show the various stages involved in the method of forming a stem with a groove and assembling a snap ring. The completed stem formed by the method of the present invention is adapted to have its upper end inserted into the leg of a chair or other piece of furniture and its lower end inserted into a caster wheel assembly.

The stem, generally indicated by the numeral 10, is formed from a substantially cylindrical solid length of metal wire 12 which has been cut to the required length as shown in FIG. 1. At the first station, the stem 10 is forced into a die and the diameter of the stem is reduced at the base thereby defining a stem end 14, a first tapered portion 16 and a stem body 18. The upper or top end of the stem body 18, opposite the stem end 14, is then pierced by a punch at 20, to form a substantially cylindrical recess. 10 As shown in FIG. 3, the diameter of the pierced end of the stem body 18 is reduced at the second station thereby forming a pierced extension 22 defining a second tapered portion 24. The diameter of the lower portion of the stem body 18 is also reduced thereby defining a third tapered portion 26 such that the stem body 18 now comprises an upper body 28, defined between the second tapered portion 24 and the third tapered portion 26 and a lower body 30 defined between the third tapered portion 26 and the first tapered portion 16.

At the third station, as seen in FIG. 4, the diameter of the pierced extension 22 is reduced further.

At the fourth stage of the formation process, as seen in FIG. 5, the second tapered portion 24 defined at the base of the pierced extension 22 is coined to form a flat, squared-off support surface 32 of larger diameter than the extension 22. The support surface 32 extends laterally about the circumference of the base of the pierced extension 22 and forms the lower wall of a groove. This support surface 32 replaces the second tapered portion 24. The support surface 32 can also be formed, as shown in FIG. 11, with a downwardly sloped lower surface 48. The first tapered portion 16 defined at the bottom of the stem end 14 is also coined to form a flat, squared-off surface 34. This flat surface 34 replaces the first tapered portion 16. The third tapered portion 26 between the upper body 28 and lower body 30 is upset to form a shoulder 36 which extends outwardly about the periphery of the stem body 18 between the upper body 28 and the lower body 30.

In the fifth stage of the process, as shown in FIG. 6, a retention protuberance 38 is formed at the base of the stem 14 which is squared-off. A snap ring 40 is then positioned about the pierced extension 22 such that it rests upon the support surface 32. The ring has an inner diameter slightly larger than the diameter of the extension 22 and an outer diameter, in its uncompressed condition slightly larger than the diameter of the body 28.

As best shown in FIGS. 7 and 8, a retention groove 42 is then formed by inserting a punch into the recess 20 in the pierced extension 22 and applying downward force thereby pending over the pierced extension 22 to form a collar 44. Preferably this is done by a cold heading process. The collar 44 becomes the upper wall of the retention groove 42 and the support surface 32 becomes the lower wall. When the pierced extension 22 is peened over to form the collar 44, an upwardly and outwardly inclined surface 46 is formed on the undersurface of the collar 44 producing a wedging effect as seen in FIGS. 8 and 11 which causes the snap ring 40 to move up the inclined surface 46 when a force is exerted on the stem tending to remove the stem and caster from the article of furniture it supports. This causes the snap ring 40 to expand thereby increasing the force required to remove the stem from its base. This feature prevents any unintentional dislodgement of the stem. When the support surface 32 is formed in accordance with the preferred embodiment, as in FIG. 11, to include a downwardly sloped lower surface 48, this facilitates ease of insertion of the stem by urging compression of the snap ring which moves down the inclined surface 48 causing the snap ring to constrict.

This method of forming a stem with a groove and assembling a snap ring is less expensive, quicker and easier 10 than previous methods wherein the groove was formed by milling a slot into the stem and inserting the snap ring into the slot by expanding the ends to accommodate the inner diameter of the stem located within the groove and then contracting the ends. With the ends of the snap ring expanded, the snap ring fits loosely about the groove and tends to extend over the edges of the support surface defined by the upper body of the stem. This makes it difficult to thread the stem into the hole in a chair leg. With the method of the present invention, the snap ring 40 is more closely centered about the pierced extension 22 since the ends of the snap ring 40 do not need to be expanded to fit about the diameter of the pierced extension 22. The wedging effect is beneficial because as the upper body 28 of the stem 10 is inserted into a leg, the snap ring 40 locates against the support surface 32, but when force is exerted to remove the stem 10 from the leg, the snap ring 40 moves against the wedge thereby resisting the pull-out force to a greater extent than with the straight-sided cylindrical undercut of prior art devices. This wedging effect also offsets any tendency of the stem to fall out of the chair leg.

Thus it has been shown that the present invention provides an easy, less expensive, and quicker method of forming a stem with a groove and a snap ring and provides a stem and snap ring assembly which facilitates insertion of the stem into its base but retards removal of the stem.

Various features of the invention have been particularly shown and described in connection with the illustrated embodiment of the invention, however, it must be understood that these particular arrangements merely illustrate and that the invention is to be given its fullest interpretation within the terms of the appended claims.

What is claimed:

1. A method of forming a stem with a groove and assembling a snap ring in said groove without expansion of said ring, the steps of the method comprising:
   (a) cutting a length of wire, thereby providing a stem blank with a top end and a bottom end;
   (b) piercing said top end of said stem blank thereby forming a recess in said top end, such that said stem blank now comprises a stem body;
   (c) reducing the diameter of said pierced top end thereby forming a pierced extension extending from said top end of said stem body;
   (d) forming a support surface about said stem body at a base of said pierced extension, said support surface having a diameter greater than the diameter of said extension;
   (e) sliding a snap ring over said pierced extension without expansion of said ring and positioning said snap ring on said support surface;
   (f) inserting a punch into said recess defined in said pierced extension and applying downward force with said punch, thereby peening said pierced extension over said snap ring and forming a collar, said collar spaced from said snap ring forming an upper wall of a groove, defined between said upper wall and said support surface, said snap ring lying within said groove and being free to move from said support surface towards said collar.

2. The method of claim 1 which said peening over is accomplished by a cold heading process.

3. The method of claim 1 including forming said collar with an upwardly and outwardly sloped undersurface.

4. The method of claim 1 including forming said support surface such that said support surface is inwardly and downwardly inclined.

* * * * *